US008122348B2

(12) United States Patent
Petri

(10) Patent No.: US 8,122,348 B2
(45) Date of Patent: Feb. 21, 2012

(54) ON-DEMAND BURSTING IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 1208 days.

(21) Appl. No.: 11/847,070

(22) Filed: Aug. 29, 2007

(65) Prior Publication Data

US 2009/0063958 A1    Mar. 5, 2009

(51) Int. Cl.
*G06N 3/00* (2006.01)
(52) U.S. Cl. ......................................................... 715/255
(58) Field of Classification Search .................. 715/234, 715/243, 254, 255
See application file for complete search history.

(56) References Cited

U.S. PATENT DOCUMENTS

2004/0236752 A1 * 11/2004 Han et al. .......................... 707/10
2007/0100829 A1 *  5/2007 Allen et al. ........................ 707/9

OTHER PUBLICATIONS

"XML Application Development Guide", Version 5.2.5 Mar. 2004, pp. 42-43.
"Virtual Documents", pp. 1-4, printed Aug. 29, 2007 at http://www.ddj.com/184412896.
Eric Severson, Whitepaper, "Integrating XML Publishing with a Content Management System: Best Practices", pp. 1-21, 2003.
"Darwin Information Typing Architecture", pp. 1-3, printed Aug. 29, 2007 at http://en.wikipedia.org/wiki/DITA.
"DITA Specification draft", p. 1, printed Aug. 29, 2007 at http://docs.oasis-open.org/dita/v1.0/archspec/ditaspec.toc.html.
"XQuery", pp. 1-5, printed Aug. 29, 2007 at http://www.en.wikipedia.org/wiki/XQuery.
"XQuery 1.0: An XML Query Language", printed Aug. 29, 2007 at http://www.w3.org/TR/xquery.

* cited by examiner

*Primary Examiner* — Kyle Stork
(74) *Attorney, Agent, or Firm* — Martin & Associates LLC; Derek P. Martin

(57) ABSTRACT

When creating or editing a document in a content management system and specific content is needed, documents in the repository are searched for an element that has the desired content. If an element is found in a document in the repository that has the desired content, the element is bursted on-demand by extracting the element from the parent document where it was found and creating a document in the repository for the element. A link that points to the bursted document in the repository is then inserted into the document that needed the element. If the parent document from which the element was extracted is mutable, then the element in the parent document is replaced with a link to the bursted document. If the parent document is immutable, a copy of the content is created as a document in the repository, and a version policy corresponding to the parent document is stored so that if the parent document becomes mutable, the parent document will include information in the version policy to allow linking to the bursted document.

16 Claims, 5 Drawing Sheets

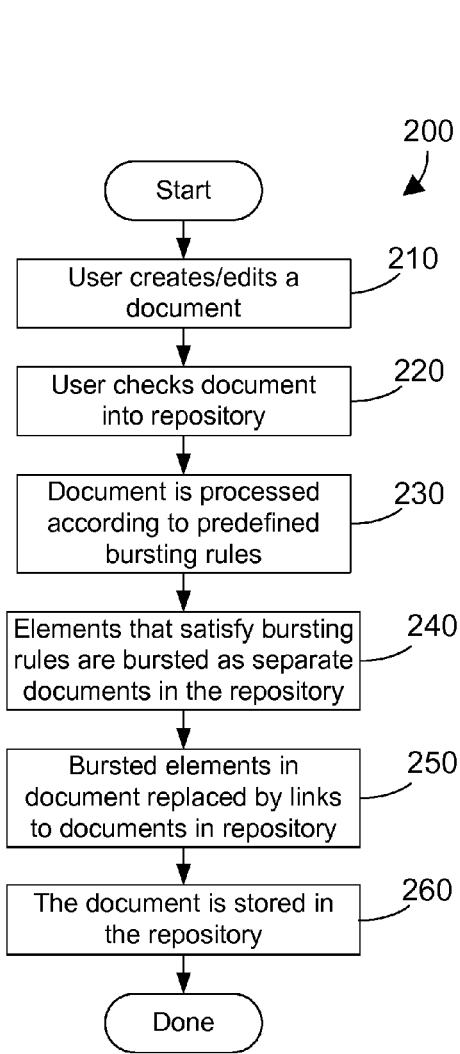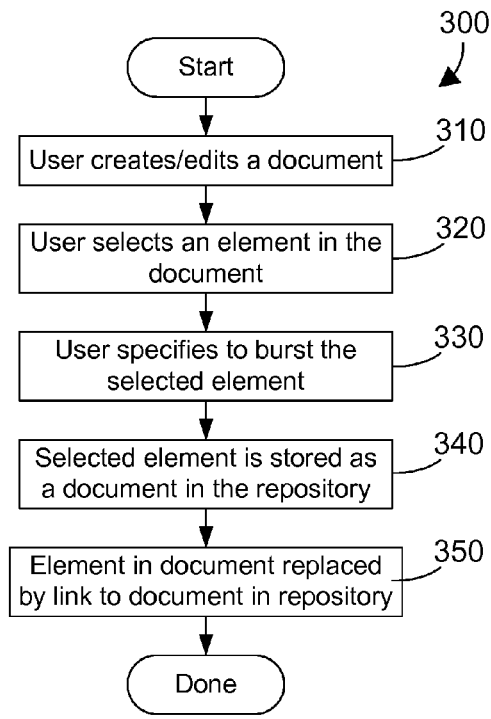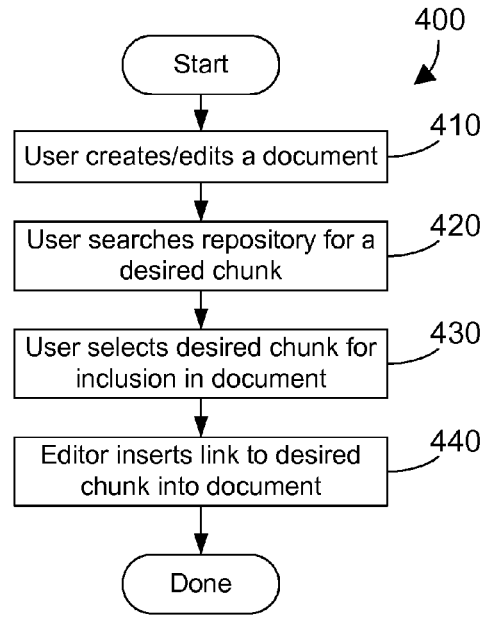
FIG. 2  Prior Art
FIG. 3  Prior Art
FIG. 4  Prior Art

ON-DEMAND BURSTING IN A CONTENT MANAGEMENT SYSTEM

BACKGROUND

1. Technical Field

This disclosure generally relates to content management systems, and more specifically relates to bursting in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Known content management systems check their rules when content comes into or out of the repository. If a rule is satisfied, the CMS may perform subsequent processing on the content. Known content management systems may include rules related to bursting, linking, and synchronization. Bursting rules govern how a document is bursted, or broken into individual chunks, when the document is imported or checked into the repository. By bursting a document into chunks, the individual chunks may be potentially reused later by a different author. Linking rules are used for importing and associating objects related to a CMS document based on particular elements or attributes from the document as specified by the rules. For example, an XML document that references external images can take advantage of linking rules so that relationships between the XML content and the external images are automatically created when the document is imported or checked into the repository. Another kind of linking rule governs what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

Bursting rules allow an element in a document to be saved as it's own document (i.e., object) in the CMS so the element may be reused by other authors. These bursting rules can be applied automatically by the CMS when a document is imported or checked into the repository (system-level bursting). In addition, a user may explicitly command bursting of one or more elements in a document while editing a document (user-level bursting). When system-level bursting is used, it is difficult for a system administrator to determine how sensitive to make the bursting rules. If the bursting rules generate larger chunks, then there will not be enough reuse in the system to make it effective, while if the bursting rules generate smaller chunks, reusability increases, but system performance decreases. When user-level bursting is used (i.e. when the responsibility of bursting is left to authors), content reuse is significantly reduced as it is difficult for authors to know which elements of their document are good candidates for reuse. Without a way to burst documents in a CMS more intelligently, the efficient reuse of content in a content management system will be impaired.

BRIEF SUMMARY

When creating or editing a document in a content management system and specific content is needed, documents in the repository are searched for an element that has the desired content. If an element is found in a document in the repository that has the desired content, the element is bursted on-demand by extracting the element from the parent document where it was found and creating a document in the repository for the element. A link that points to the bursted document in the repository is then inserted into the document that needed the element. If the parent document from which the element was extracted is mutable, then the element in the parent document is replaced with a link to the bursted document. If the parent document is immutable, a copy of the content is created as a document in the repository, and a version policy corresponding to the parent document is stored so that if the parent document becomes mutable, the parent document will include information in the version policy to allow linking to the bursted document.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a flow diagram of a prior art method for automatic rule-based bursting in a known content management system when a document is checked into the repository;

FIG. 3 is a flow diagram of a prior art method for a user to manually burst an element while creating or editing a document;

FIG. 4 is a flow diagram of a prior art method for reusing chunks stored in the repository;

DETAILED DESCRIPTION

Figure 1:
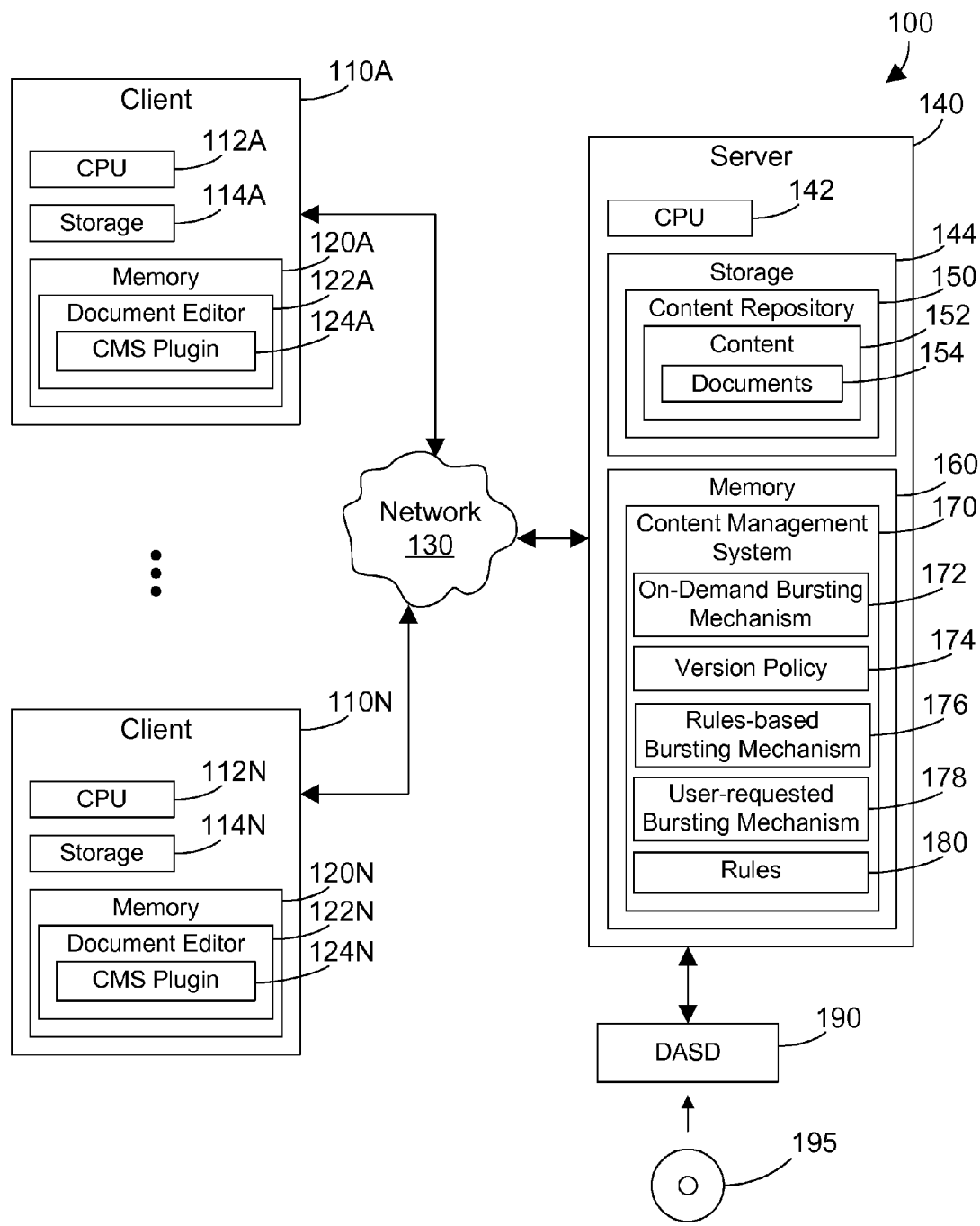
FIG. 1 is a block diagram of a networked computer system that includes a server computer system that has a content management system that includes an on-demand bursting mechanism.

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Known content management systems support both automatic rules-based bursting when a document is imported or checked into a repository, as well as user-requested bursting that occurs when a user is authoring a document. An example of rules-based bursting when a document is checked into the repository is shown by prior art method 200 in FIG. 2. A user creates or edits a document (step 210). The user then checks the document into the repository (step 220). The document is processed according to any defined bursting rules (step 230). Elements in the document that satisfy the bursting rules are bursted as separate documents in the repository (step 240). This means the elements are extracted from the document and stored in the repository as documents. The bursted elements in the document are then replaced by links to the bursted documents in the repository (step 250). The document is then stored in the repository (step 260). The rules-based bursting illustrated in method 200 in FIG. 2 is only as good as the rules that specify what to burst. If the rules cause too much bursting, the result is many documents in the repository that may never be reused. The existence of many documents that may never be reused negatively affects system performance of the content management system. If the rules cause too little bursting, the result is authors will not efficiently be able to reuse content that has been previously created.

Referring to FIG. 3, method 300 illustrates that known content management systems also support bursting under user command when the user is creating or editing a document (step 310). The user selects an element in the document (step 320). The user may then specify to burst the selected element (step 330). This is typically a command the user may invoke in the editor. In response, the selected element is stored as a document in the repository (step 340), and the element in the document is replaced by a link to the document in the repository (step 350). Known content management systems typically do not rely on the user to perform all needed bursting because users may not have a good idea of those elements that may be reused by others and those that may not. As a result, the user-initiated bursting shown in method 300 is generally a feature of an editor that allows a user to specify bursting of a particular element, but this is generally used in content management systems that also include the rule-based bursting described in method 200 in FIG. 2.

Method 400 in FIG. 4 illustrates a prior art method for a user to locate and reuse content in a content management system. We assume the user created or edits a document (step 410). The user may search a repository for a desired chunk (step 420). If the desired chunk is found in the repository, the user may select the desired chunk for inclusion in the document (step 430). In response, the editor inserts a link to the desired chunk into the document (step 440). Method 400 illustrates how elements that were previously bursted may be reused by an author when creating or editing a document.

An improved content management system as disclosed and claimed herein improves upon the known bursting techniques in FIGS. 2 and 3 and improves upon the known technique for reusing content in FIG. 4. When a user creates or edits a document, the user may perform a search of the repository, not just for documents that may be linked to, but for any suitable content, even when the content is an element in a document that has other elements. If the search returns an element within a document that the user wants to use, the user may specify to burst the element on-demand, meaning the element is extracted from the parent document where it was found and stored as a separate document in the repository. A link to the newly-created document is then created in the current document the user is creating or editing. If the parent document is mutable, the element in the parent document is replaced with a link to the element. If the parent document is immutable, a version policy is stored with the parent document to indicate that the element in the immutable document could be linked to in the future if the document is changed from immutable to mutable. This on-demand bursting is independent of the known rules-based bursting and user-requested bursting described above, and can thus be used either with or without either or both of these known bursting methods.

Referring to FIG. 1, networked computer system 100 includes multiple clients, shown in FIG. 1 as clients 110A, . . . , 110N, coupled to a network 130. Each client preferably includes a CPU, storage, and memory that contains a document editor, a content management system (CMS) plugin, and a CMS rule checking mechanism. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. Content 152 may include one or more documents 154. As used in the disclosure and claims herein, the term "document" means any type of data that may be managed by a content management system, including all known types of data and objects as well as those developed in the future, and the term "element" means any section or portion of a document. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes on-demand bursting mechanism 172, rules-based bursting mechanism 174, user-requested bursting mechanism 178, and rules 180. Rules 180 may include bursting rules, linking rules, and synchronization rules. Of course, other rules, whether currently known or developed in the future, could also be included in rules 180. On-demand bursting mechanism 172 extracts content from a document 154, creates at least one document in content repository 150 from the extracted content, and inserts a link into a different document to reference the extracted content. Rules-based bursting mechanism 176 is a prior art bursting mechanism that performs method 200 in FIG. 2. User-requested bursting mechanism 178 is a prior art bursting mechanism that performs method 300 in FIG. 3. The rules-based bursting mechanism 176 and user-requested bursting mechanism 178 are not required for the on-demand bursting mechanism 172 to function properly, but are shown in FIG. 1 because the on-demand bursting mechanism 172 can be the only bursting mechanism in a content management system, or may be one of multiple bursting mechanisms that are present in a content management system.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 5:
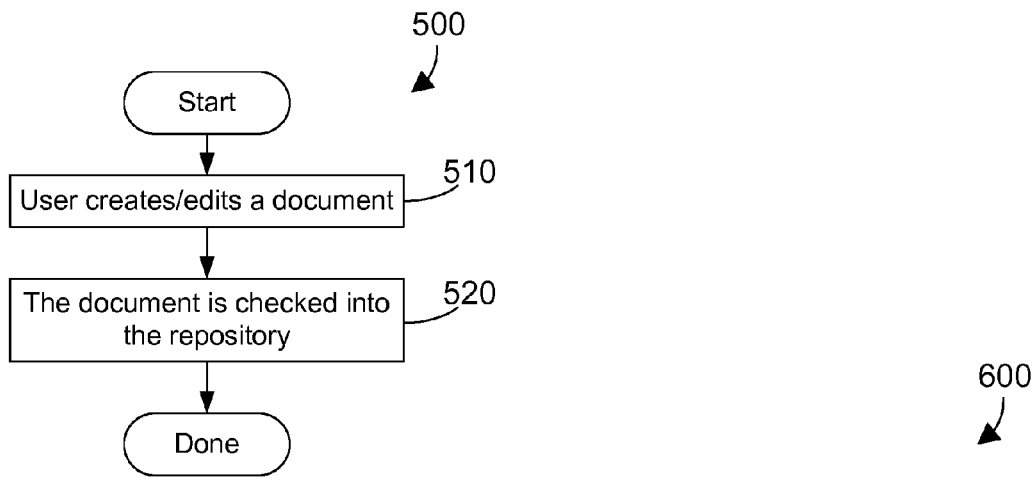
FIG. 5 is a flow diagram of a method for checking a document into the repository.

Referring to FIG. 5, method 500 begins with a user creating a document (step 510). The document is then checked into the repository (step 520). In this specific example, we assume for the sake of illustration that rules-based bursting is not performed when a document is checked into the repository. This approach avoids bursting until an element in one document is needed in another document, allowing the on-demand bursting disclosed herein to only burst documents to the repository that will be actually referenced in another document.

Figure 6:
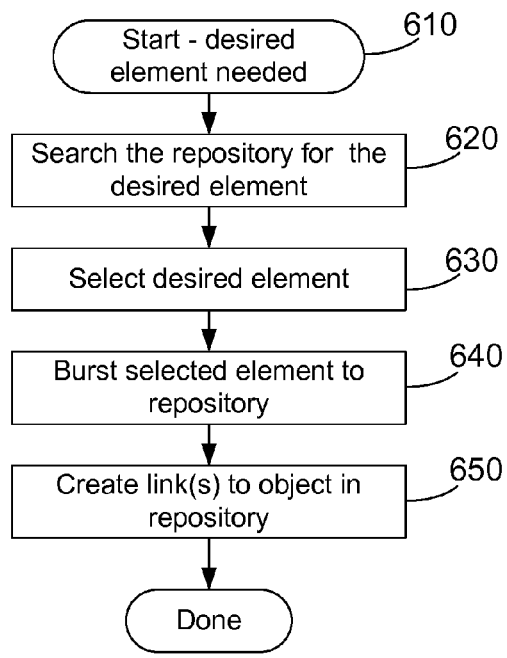
FIG. 6 is a flow diagram of a first method for bursting an element on-demand.

Referring to FIG. 6, a method 600 begins when a desired element is needed (step 610), either by a user creating or editing a document, or by an automated process. The repository is searched for the desired element (step 620). Note the search in step 620 in FIG. 6 is different than the search in step 420 in FIG. 4. In prior art method 400 in FIG. 4, step 420 searches for a desired chunk in the repository, which means the user is looking for an existing document in the repository that may be linked to in the current document. In step 620 in FIG. 6, in contrast, the search is made not just of documents that might be linked to, but a search for the desired element is also made within documents that have other elements as well. This search may be performed using known searching constructs such as XQuery and XPath, which are well-known in the art for searching XML documents. Assuming the desired element is located in a document that has other elements, the desired element is selected (step 630). The selection of the element in another document for inclusion in the current document causes the element to be bursted to the repository (step 640), thereby creating a separate document in the repository that contains the element. Links are then created to the newly-created document in the repository (step 650), preferably one in the parent document where the element was found, and one in the document currently being edited.

Method 600 in FIG. 6 works well when documents in the repository may be freely changed. However, in some environments, when review of a document is pending or the document has been approved, the document may be marked as immutable, meaning the document cannot be changed. When a repository may include immutable documents, the content management system will not allow an element in an immutable document to be removed and replaced by a link. For this reason, provision needs to be made for the difference between mutable in immutable documents.

Figure 7:
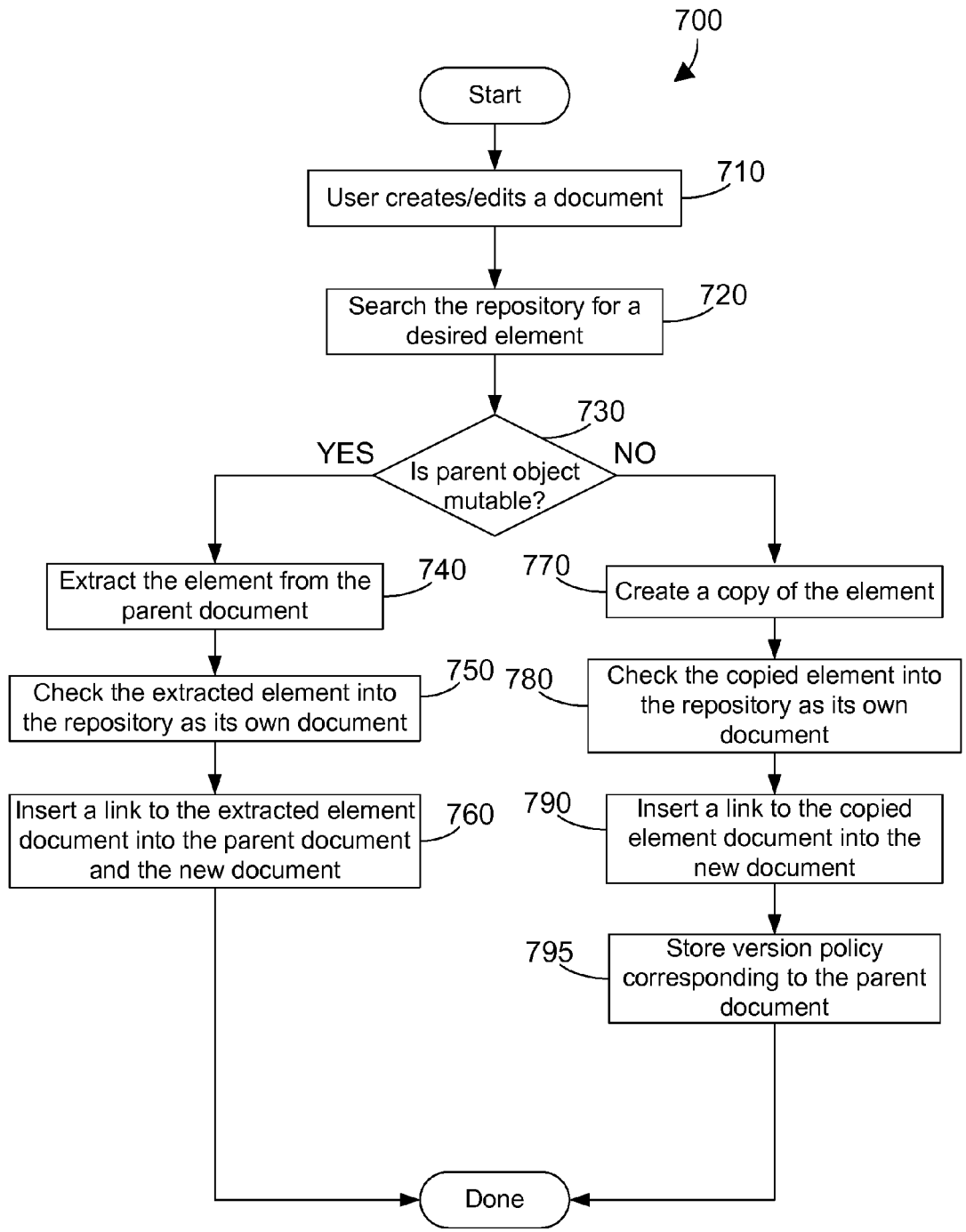
FIG. 7 is a flow diagram of a second method for bursting an element on-demand when the element may be in a parent document that is immutable.

Referring to FIG. 7, a method 700 is one suitable implementation for method 600 in FIG. 6 when an environment may include both mutable and immutable documents. Method 700 begins when a user creates or edits a document (step 710). The repository is searched for a desired element (step 720). We assume for this example the desired element is found in a parent document in the repository that also has other elements as well. If the parent document where the desired element is found is mutable (step 730=YES) then the element is extracted from the parent document (step 740). The extracted element is then checked into the repository as its own document (step 750). A link to the extracted element document is inserted into the parent document and into the new document (step 760) and method 700 is done. If the parent document is not mutable (step 730=NO) then a copy of the element is created (step 770). The copied element is then checked into the repository as its own document (step 780). A link to the copied element document is inserted into the new document (step 790). A version policy corresponding to the parent document is then stored (step 795) and method 700 is done. The version policy indicates that the document could link to the newly created chunk if the document is taken from immutable state to a mutable state. The version policy is preferably attached to the parent document, but could also be stored in a separate data structure that correlates the version policy to the corresponding parent document.

Figure 8:
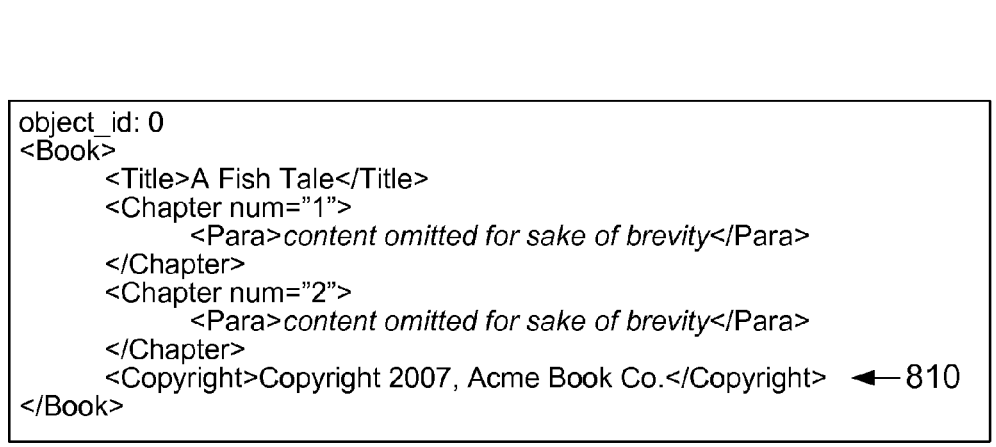
FIG. 8 shows a sample XML document created by a user and checked into the repository.

A simple example is now given to illustrate many of the concepts discussed above. FIG. 8 shows a document 800 that we assume for this example was created by a user (step 510 in FIG. 5) and checked into the repository (step 520 in FIG. 5). Note that document 800 is of type Book, and contains an element of type copyright, as shown at 810. Now we assume another user creates a new document of type Book (step 710 in FIG. 7). The user needs to insert a copyright element, and so the repository is searched to find a copyright element (step 720). Let's first assume that document 800 shown in FIG. 8 is mutable (step 730=YES). Copyright element 810 is extracted from document 800 (step 740) and is checked into the repository as document 900 shown in FIG. 9 (step 750). Because document 800 is mutable, the copyright element 810 in document 800 is removed, and a link 1010 to document 900 is inserted into document 800, as shown in document 800 in FIG. 10. Since copyright element 810 in FIG. 8 is now document 900 in the repository, the new document can then include a link to document 900 to reuse the same copyright element that document 800 in FIG. 10 references.

Figure 9:
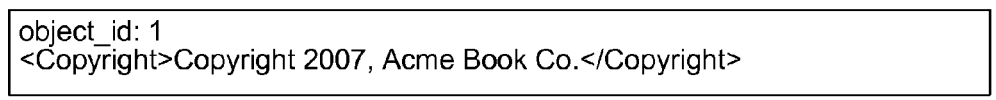
FIG. 9 shows a sample element extracted from the parent document shown in FIG. 7 into its own document in the repository.

Now we see how the process changes if we assume document 800 is immutable (step 730=NO). If the document 800 is immutable, the data in document 800 cannot be changed or the integrity of the document would be compromised. The data is copied from the parent document (step 770) and the copied element is checked into the repository as its own document (step 780). Document 900 represents the copyright element 810 in FIG. 8 after it is copied from the parent document and stored as its own document in the repository. A link to the document 900 is then inserted into the document being created (step 790). Note the parent document cannot be modified because it is immutable. However, information may be stored that indicates a document that may be linked to if the parent document becomes mutable in the future. A suitable version policy 1100 for the copyright element 900 in FIG. 9 shows the element/Book/Copyright could be replaced with a link to document 900 in FIG. 9, which has an object_id of 1. The binding is listed as CURRENT to indicate that the link should follow the current version of document 900 in FIG. 9. In other words, this represents a floating relationship such that whenever document 900 in FIG. 9 moves to a new major version (e.g. 1.0, 2.0, etc.) the link to that document will accordingly point to the document's latest major version. Thus in the case of a CURRENT binding, the parent document can always reference the most up to date major version of its child document without having to explicitly state a version number. The version policy 1100 stores information that may be used to increase the reuse of components if the parent document is put back into a mutable state. A document may transition from a mutable state to an immutable state and back several times over the document's lifetime as the document may be under revision at many different stages.

Figure 10:
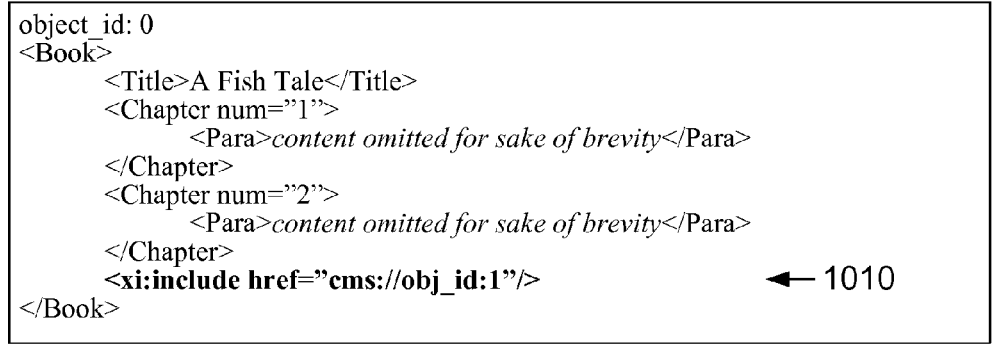
FIG. 10 shows the sample document from FIG. 8 after a link to document 900 shown in FIG. 9 has been inserted.
Figure 11:
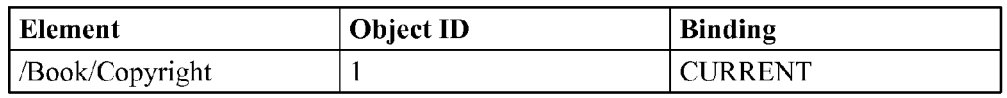
FIG. 11 shows a sample version policy that may be stored for the parent document if the parent document is immutable when the on-demand bursting is performed.

Version policy 1100 allows for document 800 to be updated in the event document 800 becomes mutable in the future. For example, if document 800 was immutable because it was under review when document 900 was created, version policy 1100 would be associated with document 800. After document 800 was reviewed, it could become mutable so other changes can be made to the document. When document 800 becomes mutable, copyright element 810 may be replaced with link 1010 as shown in FIG. 10. This allows for the document to be updated to take advantage of bursting even after the bursting has been completed.

In another suitable implementation, the on-demand bursting mechanism periodically scans each document in the repository, finds elements that contain identical content, bursts those elements, and replaces those elements in the documents with links to the newly created documents.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future. In addition, while the examples herein relate to bursting a single element, the disclosure and claims herein expressly extend to bursting multiple elements, whether multiple elements are bursted to corresponding individual documents in the repository or whether the multiple elements are bursted to a single document in the repository.

What is claimed is:

1. An apparatus comprising:
at least one processor;
a memory coupled to the at least one processor;
a repository residing in the memory that includes a plurality of documents that each include at least one element; and
a content management system residing in the memory and executed by the at least one processor, the content management system managing the plurality of documents in the repository, the content management system comprising:
an on-demand bursting mechanism that, in response to determining at least one desired element is needed in a first document, performs a search of at least one document in the repository to locate the at least one desired element, and when the at least one desired element is found in a second document in the repository that includes at least one additional element, the on-demand bursting mechanism extracts the at least one desired element from the second document, creates at least one document in the repository from the extracted at least one element, returns at least one link to the at least one created document, and inserts the at least one link to the at least one created document into the first document.

2. The apparatus of claim 1 wherein if the first document is mutable, replacing the content in the first document with a link to the at least one created document.

3. The apparatus of claim 1 wherein if the first document is immutable, storing a version policy corresponding to the first document that indicates at least one element in the first document that may be replaced with a link to the at least one created document when the first document becomes mutable.

4. The apparatus of claim 1 wherein the content management system further comprises a rules-based bursting mechanism for bursting at least one element in a document upon check-in or import of the document to the repository based on at least one bursting rule.

5. The apparatus of claim 1 wherein the content management system further comprises a user-level bursting mechanism that bursts at least one element in a document when a user requests bursting of the at least one element while editing the document.

6. A computer-implemented method for on-demand bursting in a content management system that manages a plurality of documents in a repository, the method comprising the steps of:
   determining at least one desired element is needed in a first document;
   in response to the determining the at least one desired element is needed in the first document, performing the steps of:
   searching at least one document in the repository to locate the at least one desired element;
   when the at least one desired element is found in a second document in the repository that includes at least one additional element, performing the steps of:
      extracting the at least one desired element from the second document;
      creating at least one document in the repository from the extracted at least one element; and
      returning at least one link to the at least one created document; and
      inserting the at least one link to the at least one created document into the first document.

7. The method of claim 6 wherein if the first document is mutable, replacing the content in the first document with a link to the at least one created document.

8. The method of claim 6 wherein if the first document is immutable, storing a version policy corresponding to the first document that indicates at least one element in the first document that may be replaced with a link to the at least one created document when the first document becomes mutable.

9. The method of claim 6 further comprising the step of performing rules-based bursting that bursts at least one element in a document upon check-in or import of the document to the repository based on at least one bursting rule.

10. The method of claim 6 further comprising the step of performing user-level bursting that bursts at least one element in a document when a user requests bursting of the at least one element while editing the document.

11. A computer-implemented method for on-demand bursting in a content management system that manages a plurality of documents in a repository, the method comprising the steps of:
   (A) a first user creating a first document that includes a first element and a second element;
   (B) the first user checking the first document into the repository;
   (C) a second user creating a second document;
   (D) the second user executing a search of the first document in the repository for the first element;
   (E) when the first element is found in the first document, performing the steps of:
      extracting the first element from the first document;
      creating at least one new document in the repository from the extracted first element;
      inserting at least one link to the at least one new document in the second document;
      if the first document is mutable, replacing the content in the first document with a link to the at least one new document;
      if the first document is immutable, storing a version policy corresponding to the first document that indicates at least one element in the first document that may be replaced with a link to the at least one new document when the first document becomes mutable; and
   (F) checking the second document into the repository.

12. An article of manufacture comprising:
   (A) a content management system comprising:
      a repository that includes a plurality of documents that each include at least one element;
      an on-demand bursting mechanism that, in response to determining at least one desired element is needed in a first document, performs a search of at least one document in the repository to locate the at least one desired element, and when the at least one desired element is found in a second document in the repository that includes at least one additional element, the on-demand bursting mechanism extracts the at least one desired element from the second document, creates at least one document in the repository from the extracted at least one element, returns at least one link to the at least one created document, and inserts the at least one link to the at least one created document into the first document; and
   (B) computer-readable recordable media bearing the content management system.

13. The article of manufacture of claim 12 wherein if the first document is mutable, replacing the content in the first document with a link to the at least one document.

14. The article of manufacture of claim 12 wherein if the first document is immutable, associating a version policy to the first document that indicates at least one element in the first document that may be replaced with a link to the at least one created document when the first document becomes mutable.

15. The article of manufacture of claim 12 further comprising a rules-based bursting mechanism for bursting at least one element in a document upon check-in or import of the document to the repository based on at least one bursting rule.

16. The article of manufacture of claim 12 further comprising a user-level bursting mechanism that bursts at least one element in a document when a user requests bursting of the at least one element while editing the document.

* * * * *